(12) United States Patent
Smith et al.

(10) Patent No.: US 8,635,742 B2
(45) Date of Patent: Jan. 28, 2014

(54) MOBILITY SYSTEM

(75) Inventors: Matthew Smith, Wooster, OH (US); Paul K Metaxatos, Swampscott, MA (US)

(73) Assignee: Waxman Consumer Products Group Inc., Bedford Heights, OH (US)

( * ) Notice: Subject to any disclaimer, the term of this patent is extended or adjusted under 35 U.S.C. 154(b) by 285 days.

(21) Appl. No.: 13/114,290

(22) Filed: May 24, 2011

(65) Prior Publication Data

US 2011/0293396 A1 Dec. 1, 2011

Related U.S. Application Data

(60) Provisional application No. 61/348,993, filed on May 27, 2010.

(51) Int. Cl.
*A47B 91/06* (2006.01)

(52) U.S. Cl.
USPC ............... 16/42 R; 16/18 R; 16/19; 280/15; 280/18; 280/18.1; 280/19

(58) Field of Classification Search
USPC ............... 280/15, 18, 18.1, 19, 23.1, 24, 28, 280/28.13, 28.17, 845; 16/18 R, 19, 42, 47
See application file for complete search history.

(56) References Cited

U.S. PATENT DOCUMENTS

| | | | | |
|---|---|---|---|---|
| 870,462 A | * | 11/1907 | Penington | 280/19 |
| 1,665,449 A | * | 4/1928 | Drake | 280/19 |
| 2,219,905 A | * | 10/1940 | Prickman | 280/18.1 |
| 2,472,952 A | * | 6/1949 | Lennard | 280/35 |
| 2,601,991 A | * | 7/1952 | Kahle | 280/19 |
| 3,179,437 A | * | 4/1965 | Ensinger | 280/35 |
| 3,705,730 A | * | 12/1972 | Bergsland | 280/24 |
| 3,883,923 A | * | 5/1975 | England | 16/42 R |
| 5,081,740 A | * | 1/1992 | Smith | 16/42 R |
| 5,557,824 A | * | 9/1996 | Bushey | 16/42 R |
| D376,692 S | * | 12/1996 | Hartman | D3/315 |
| 5,802,669 A | * | 9/1998 | Wurdack | 16/42 R |
| 5,836,593 A | * | 11/1998 | Skinner | 280/19 |
| 5,984,360 A | * | 11/1999 | Edwards et al. | 280/845 |
| 6,206,424 B1 | * | 3/2001 | Edwards et al. | 280/845 |
| 6,270,091 B1 | * | 8/2001 | Smith | 280/14.21 |
| 6,464,256 B1 | * | 10/2002 | Edwards | 280/845 |
| D475,495 S | * | 6/2003 | Edwards | D34/28 |
| D475,496 S | * | 6/2003 | Edwards | D34/28 |
| D475,830 S | * | 6/2003 | Edwards | D34/28 |

(Continued)

FOREIGN PATENT DOCUMENTS

JP 60218203 A * 10/1985 ............... B65G 7/02

*Primary Examiner* — J. Allen Shriver, II
*Assistant Examiner* — Steve Clemmons
(74) *Attorney, Agent, or Firm* — Tarolli, Sundheim, Covell & Tummino LLP

(57) ABSTRACT

A mobility apparatus for transporting objects along a surface includes first and second slider arrangements for supporting an object to be transported. The first and second slider arrangements have a low friction lower surface and a high friction upper surface. The first and second slider arrangements are coupled by a common strap having first and second ends. The mobility apparatus further comprises a loop located near the second end, securing the second slider arrangement to a fixedly attached connection with the common strap. The mobility apparatus further includes first and second openings located in the first slider arrangement such that the first slider arrangement in an unloaded condition freely moves along an adjustment length of the common strap.

20 Claims, 7 Drawing Sheets

(56) References Cited

U.S. PATENT DOCUMENTS

| | | | |
|---|---|---|---|
| 6,901,629 B2 * | 6/2005 | Wurdack | 16/42 R |
| 6,926,293 B1 * | 8/2005 | Pope | 280/79.11 |
| D513,381 S * | 1/2006 | Belec | D8/400 |
| 7,028,808 B2 * | 4/2006 | Zeaman | 182/108 |
| D536,855 S * | 2/2007 | Kubosawa | D34/28 |
| D601,007 S * | 9/2009 | Brouard | D8/400 |
| 7,806,059 B2 * | 10/2010 | Bolton | 108/43 |
| 8,096,566 B2 * | 1/2012 | West | 280/79.11 |
| 2003/0042727 A1 * | 3/2003 | Khubani | 280/845 |
| 2003/0137142 A1 * | 7/2003 | Edwards | 280/845 |
| 2003/0163893 A1 * | 9/2003 | Edwards | 16/42 R |
| 2004/0068832 A1 * | 4/2004 | Edwards | 16/42 R |
| 2004/0188966 A1 * | 9/2004 | Kline | 280/79.11 |
| 2005/0011702 A1 * | 1/2005 | Zeaman | 182/108 |
| 2005/0034268 A1 * | 2/2005 | Wurdack | 16/42 R |
| 2005/0081330 A1 * | 4/2005 | Edwards | 16/42 R |
| 2005/0245372 A1 * | 11/2005 | Mylrea et al. | 482/148 |
| 2005/0263998 A1 * | 12/2005 | Edwards | 280/845 |
| 2007/0287605 A1 * | 12/2007 | Mylrea et al. | 482/92 |
| 2009/0039607 A1 * | 2/2009 | Feeney et al. | 280/18.1 |
| 2011/0085884 A1 * | 4/2011 | Jackman | 414/800 |

* cited by examiner

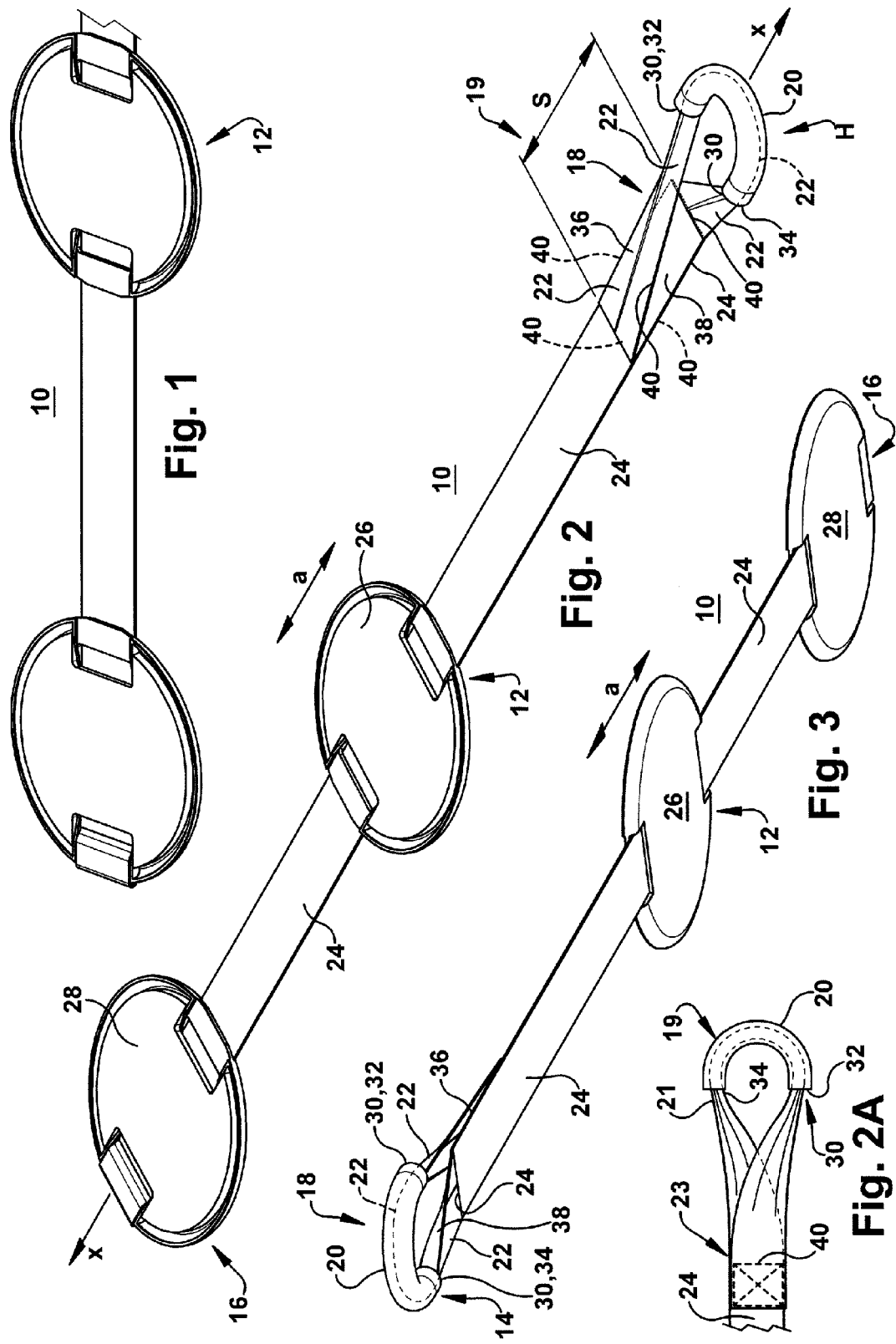

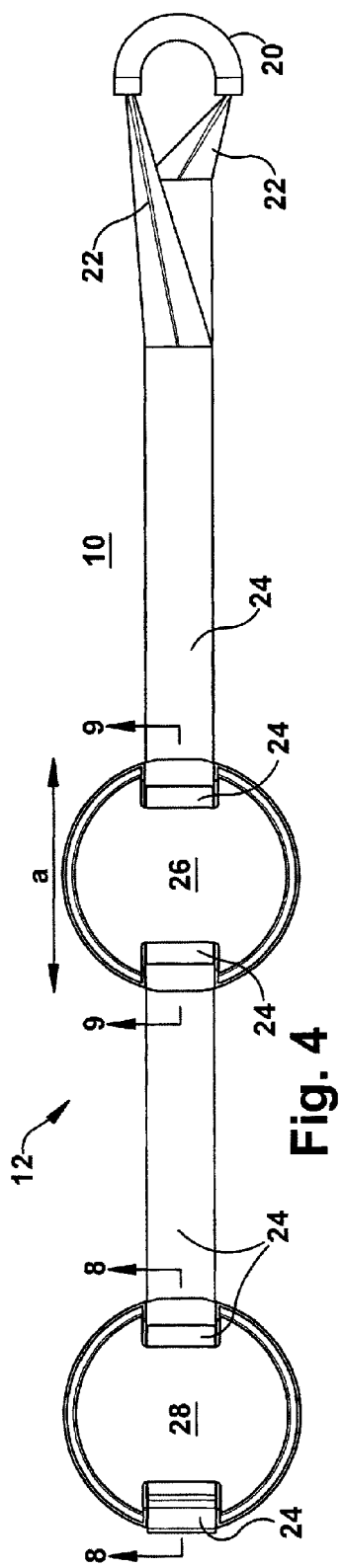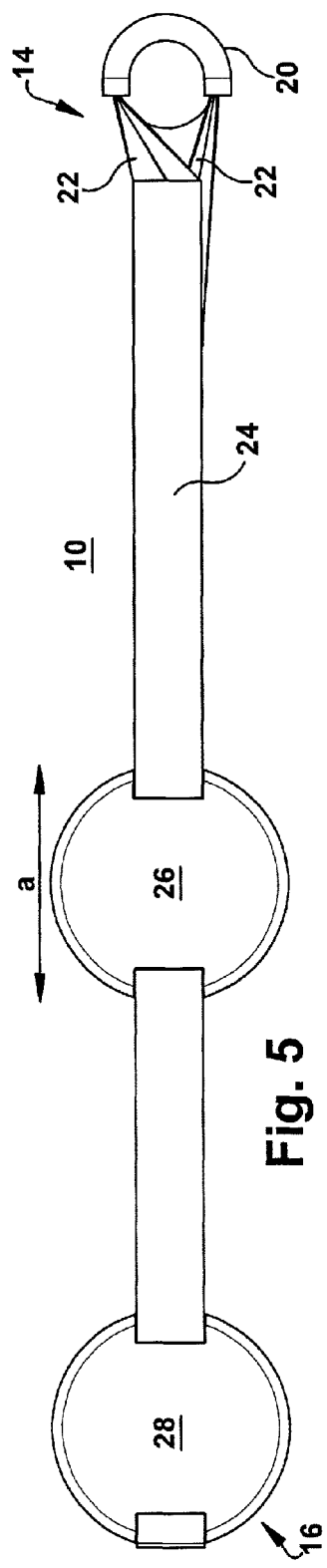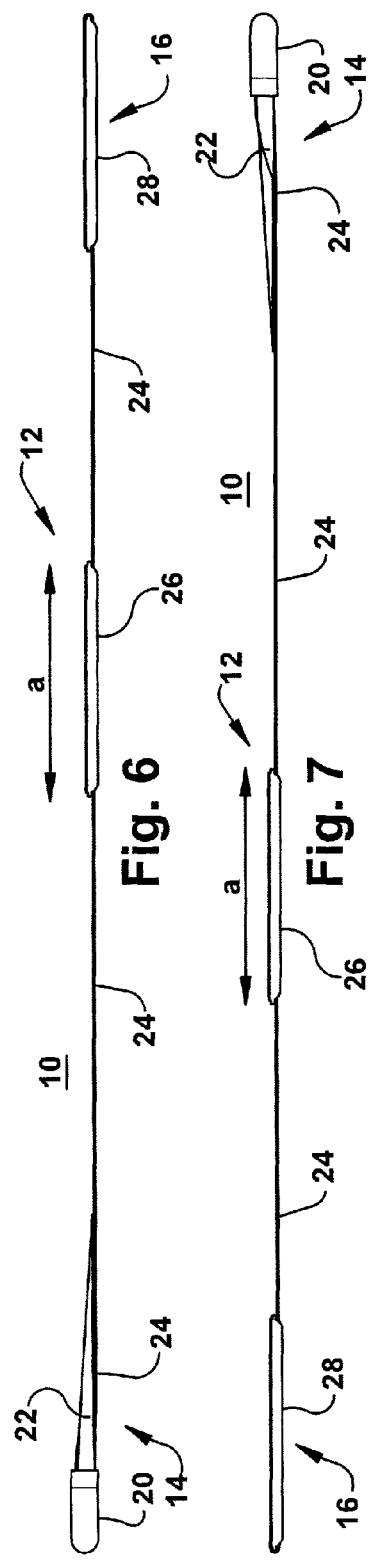

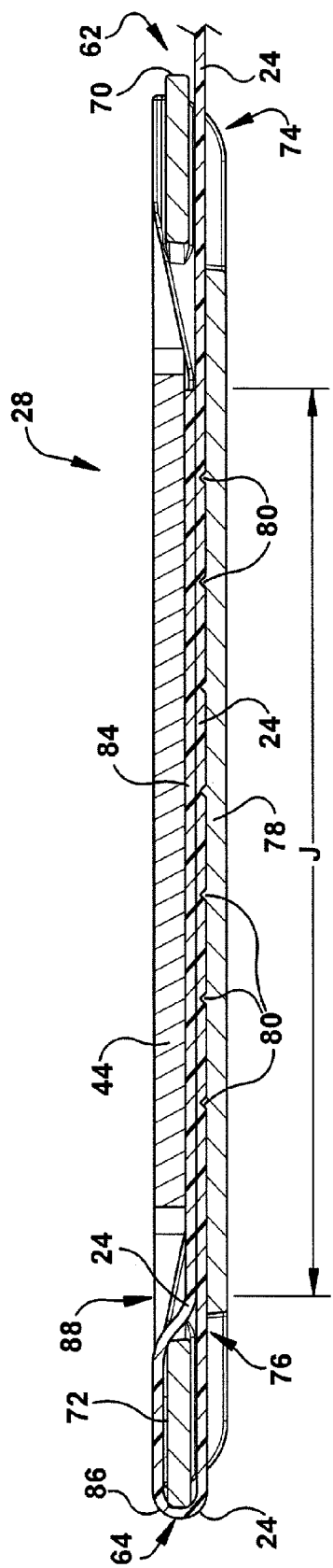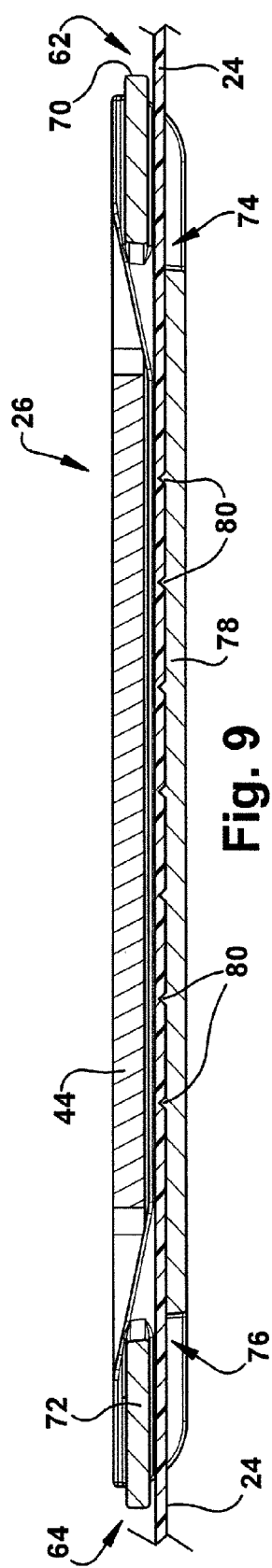

MOBILITY SYSTEM

CROSS REFERENCES TO RELATED APPLICATIONS

The following application claims priority to U.S. Provisional Patent Application Ser. No. 61/348,993 filed May 27, 2010 entitled MOBILITY SYSTEM. The above-identified application is incorporated herein by reference in its entirety for all purposes.

TECHNICAL FIELD

The present disclosure relates generally to a mobility system comprising a mobility apparatus and method for moving objects such as appliances, furniture, and the like over a distance, and more specifically, an adjustable mobility system that accommodates variations in the size of the objects to be moved.

BACKGROUND

In the moving industry, it is quite usual to face the situation of having to move large, heavy, and sometimes awkwardly shaped objects such as furniture or appliances within the confines of buildings. The movement of large objects is not limited to the venue of commercial buildings, but is equally experienced in residential settings, for example, relocating furniture to achieve a new floor plan or moving the furniture or large objects to a new home. Other occurrences arise from office downsizing, wiring upgrades, etc. that frequently mandate office reconfigurations, requiring that the furniture or objects be moved or rotated. Furniture is also frequently moved, for example, in healthcare and educational facilities for cleaning. In such instances, as in the installation of modular carpet, it is desirable to move the furniture quickly, with the least possible effort and, preferably, after hours with a limited number of workers.

Office equipment is usually moved with a hand truck, four-wheel dolly, and the like and can require several individuals working together. The work is hard, labor intensive and injuries can result during the performance of the work. Other furniture, such as workstations, computers, etc. is also difficult to move. A common method of moving the heavy objects includes employing professional movers to pick the object up and carry it by hand, but this is not always an economically feasible or a possible arrangement because of the lack or cost of labor.

Advancements in the mobility of objects, such as appliances and furniture have been made as described, for example in U.S. Patent Publication No. 2010/0050389, corresponding to U.S. patent application Ser. No. 12/199,305 that was filed Aug. 27, 2008 entitled FURNITURE SLIDE ASSEMBLIES AND METHOD OF USE and assigned to the assignee of the present application. The above Patent Publication No. 2010/0050389 is incorporated herein by reference in its entirety for all purposes.

SUMMARY

One example embodiment of the present disclosure includes a mobility apparatus for transporting objects along a surface having first and second slider arrangements for supporting an object to be transported. The first and second slider arrangements have a low friction lower surface and a high friction upper surface. The first and second slider arrangements are coupled by a common strap having first and second ends. The mobility apparatus further includes a loop located near the second end, securing the second slider arrangement to a fixedly attached connection with the common strap. The mobility apparatus further comprises first and second openings located in the first slider arrangement such that the first slider arrangement in an unloaded condition freely moves along an adjustment length of the common strap.

Another example embodiment of the present disclosure includes a method for moving an object across a surface using a mobility apparatus. The method comprises adjusting a first slider arrangement relative to a second slider arrangement about a common strap to a desired length. The common strap during adjustment in an unloaded condition freely passes through the first slider arrangement and is fixedly attached to the second slider arrangement wherein the common strap is a continuous strap. The method further comprises immobilizing the first slider arrangement for relative movement about the common strap by subjecting the first slider arrangement to a loaded condition by positioning an object to be moved upon the first slider arrangement. The method also comprises positioning the object to be moved upon the second slider arrangement and advancing the object, first and second slider arrangements, and mobility apparatus by pulling the common strap.

Another example embodiment of the present disclosure includes a mobility system for transporting objects along a surface comprising first and second slider arrangements for positioning beneath an object to be transported. The system further comprises a strap having first and second ends. The strap is coupled to the first and second slider arrangements by passing the strap through first and second openings located in the first and second slider arrangements. The system also comprises a high friction surface located in the first slider arrangement such that the first slider arrangement in an unloaded condition freely moves along an adjustment length between the first and second ends of the strap.

BRIEF DESCRIPTION OF THE DRAWINGS

The foregoing and other features and advantages of the present disclosure will become apparent to one skilled in the art to which the present disclosure relates upon consideration of the following description of the invention with reference to the accompanying drawings, wherein like reference numerals, unless otherwise described refer to like parts throughout the drawings and in which:

FIG. 1 is a partial perspective solid model view of a mobility apparatus constructed in accordance with one example embodiment of the present disclosure;

FIG. 2 is an upper perspective view of a mobility apparatus constructed in accordance with another example embodiment of the present disclosure;

FIG. 2A is a partial top plan view of a mobility apparatus constructed in accordance with another example embodiment of the present disclosure;

FIG. 3 is a lower perspective view of the mobility apparatus illustrated in FIG. 2;

FIG. 4 is a top plan view of a mobility apparatus constructed in accordance with one example embodiment of the present disclosure;

FIG. 5 is a bottom plan view of a mobility apparatus constructed in accordance with one example embodiment of the present disclosure;

FIG. 6 is a front elevation view of a mobility apparatus constructed in accordance with one example embodiment of the present disclosure;

FIG. 7 is a rear elevation view of a mobility apparatus constructed in accordance with one example embodiment of the present disclosure;

FIG. 8 is a section view of the mobility apparatus illustrated in FIG. 4 along section lines 8-8;

FIG. 9 is a section view of the mobility apparatus illustrated in FIG. 4 along section lines 9-9;

DETAILED DESCRIPTION

Figure 10:
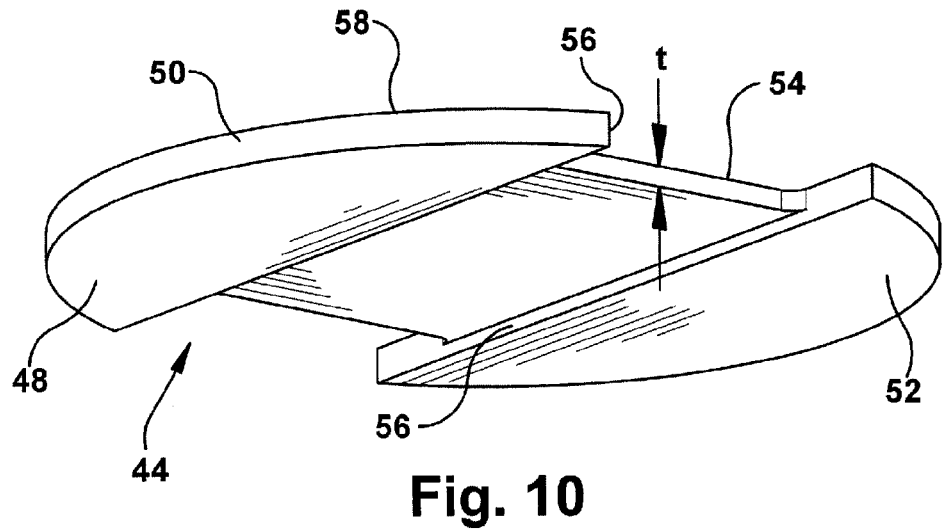
FIG. 10 is a perspective view of a support member of a slider arrangement constructed in accordance with one example embodiment of the present disclosure.
Figure 11:
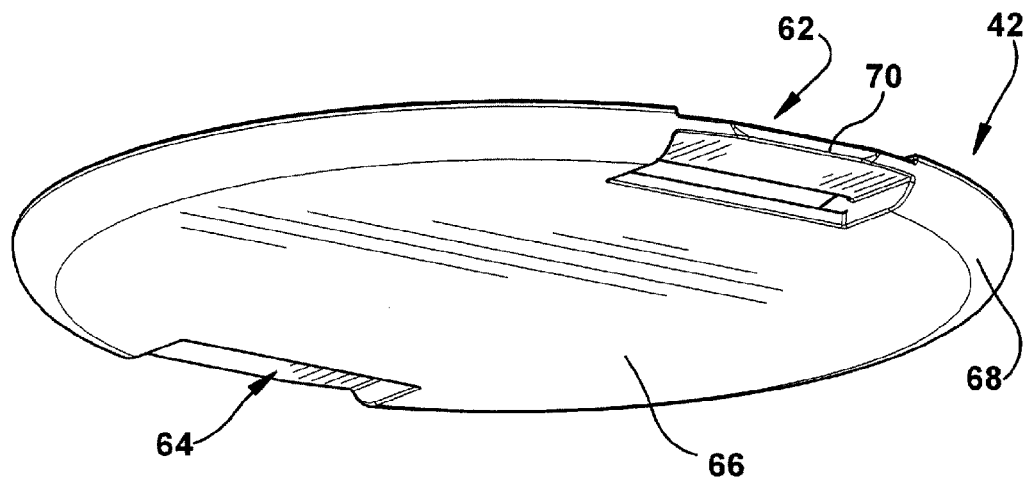
FIG. 11 is a perspective view of a housing member of a slider arrangement constructed in accordance with one embodiment of the present disclosure.
Figure 12:
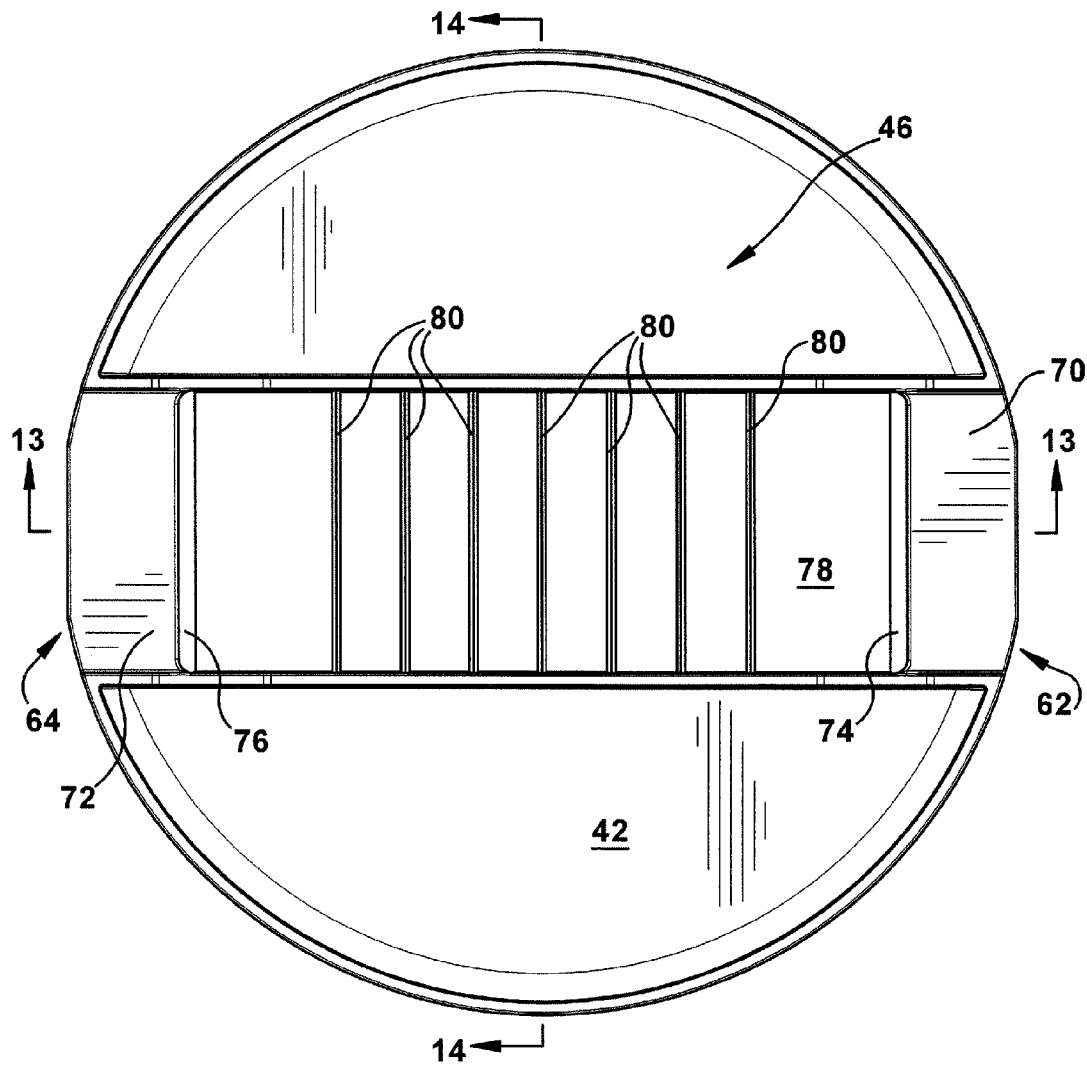
FIG. 12 is an plan view of a slider arrangement constructed in accordance with one example embodiment of the present disclosure.
Figure 13:
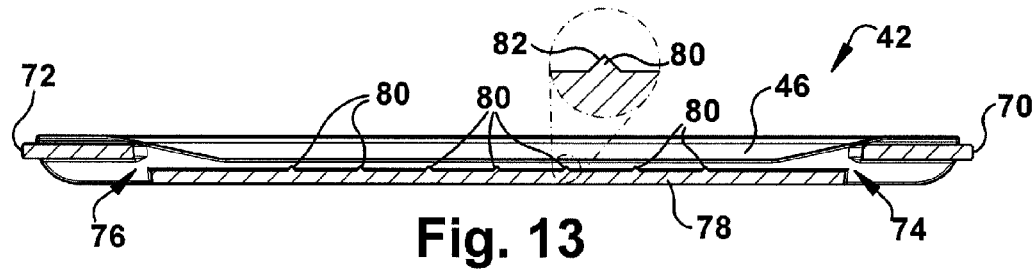
FIG. 13 is a section view of the slider arrangement illustrated in FIG. 12 along section lines 13-13.
Figure 14:
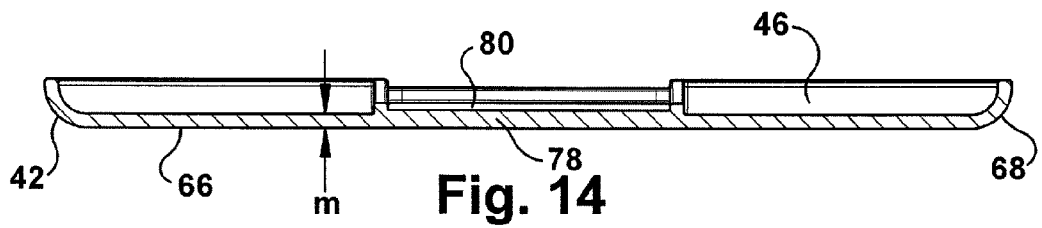
FIG. 14 is a section view of the slider arrangement illustrated in FIG. 12 along section lines 14-14.
Figure 15:
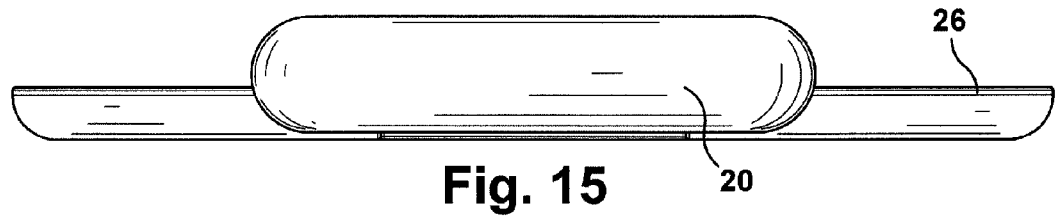
FIG. 15 is a first end view of a mobility apparatus constructed in accordance with one example embodiment of the present disclosure.
Figure 16:
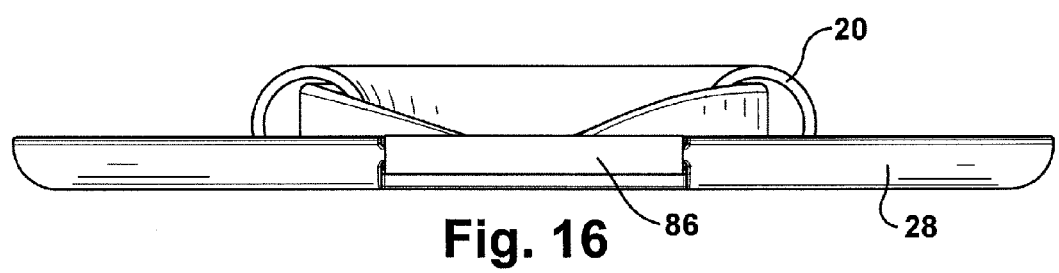
FIG. 16 is a second end view of a mobility apparatus constructed in accordance with one example embodiment of the present disclosure.

Referring now to the figures wherein like numbered features shown therein refer to like elements throughout unless otherwise noted. The present disclosure relates generally to a mobility system comprising a mobility apparatus and method for moving objects such as appliances, furniture, and the like over a distance, and more specifically, an adjustable mobility system that accommodates variations in the size of the objects to be moved.

Referring again to the figures and in particular to FIGS. 1-3 are perspective views of a mobility system 10 comprising a mobility apparatus 12 constructed in accordance with one exemplarily embodiment of the present disclosure. The mobility apparatus 12 includes first 14 and second 16 ends spaced along a longitudinal axis x-x, as illustrated in FIG. 2. Located along the first end 14 of the mobility apparatus 12 is a loop assembly 18 comprising a handle 20 and a tether 22. The loop assembly 18, and more specifically the tether 22 is secured to a strap 24 of the mobility apparatus 12 that extends through first and second slider arrangements 26 and 28, respectively.

The tether 22 passes through opening 30 in the handle 20 from a first end 32 of the handle to a second end 34. The tether 22 also comprises first end 36 and second end 38 that is secured to the strap 24 by stitching 40 at the first end 14, as shown in FIG. 2. In another example embodiment, the tether 22 ends 36, 38 are secured to the strap 24 at the strap's first end 14 within dimension "S" (see FIG. 2) by adhesive, stitching, or any combination or pattern thereof. In the illustrated example embodiment of FIGS. 2 and 3, the handle 20 is formed from a polymeric material or rubber, such as natural rubber, plastic, or foam. In the illustrated example embodiment of FIG. 2, the strap 24 is fabricated from nylon. However, other materials of equal strength and/or weight could be used for the handle 20, tether 22, and strap 24 without departing from the spirit and scope of the present disclosure.

Illustrated in FIG. 2A is a partial plan view of a handle assembly 19 constructed in accordance with another example embodiment of the present disclosure. The handle assembly 19 includes a loop ring 21 formed from the strap 24. The strap 24 loop ring 21 passes through the openings 30 in the handle 20 and is reconnected to itself, namely the strap 24 at attachment point 23. The attachment point 23 joining the loop ring 21 can be secured by stitching, adhesive boding, melting, or any combination thereof.

The mobility apparatus 12 slider arrangements 26 and 28 are positioned about the strap 24 as illustrated in FIGS. 1-3. The first slider arrangement 26 is moveably connected to the strap 24 such that the first slider arrangement can translate along the strap (in the direction of arrows "a" FIGS. 2 and 3) from the first end 14 of the strap until the first slider arrangement 26 contacts the second slider arrangement 28 at the second end 16. The translation of the first slider arrangement 26 about strap 24 provides adjustment to accommodate the size of the object being moved by the mobility system 10. In one example embodiment, the length of the strap 24 is sixty (60") inches long and two (2") inches wide, however, the length and width could vary by several inches to increase strength, strap length, or decrease cost as appreciated by one skilled in the art without departing from the spirit and scope of the present disclosure.

FIGS. 4-7 illustrate various views of an example embodiment of the mobility system 10. FIG. 8 is a section view of the mobility apparatus illustrated in FIG. 4 along section lines 8-8. FIG. 9 is a section view of the mobility apparatus illustrated in FIG. 4 along section lines 9-9.

The cross section of FIG. 8 illustrates that in the example embodiment, the second slider arrangement 28 is fixedly attached to the strap 24, that is, the slider arrangement 28 is non-adjustable or moveable along the longitudinal axis "x" of the strap. Although the first and second slider arrangements 26 and 28, respectively are identical in construction, the sole difference is the positioning and/or connection of the strap 24 with the respective slider arrangement. The slider arrangements 26 and 28 comprise a housing member 42 (see FIGS. 11-14) and a support member 44 (see FIG. 10) that is seated within a pocket 46 of the housing 42. The support member 44 includes arcuately shaped edges 50, 52 spaced by a central member 54 (see FIG. 10) and is formed from a pliable material that prevents movement of the object to be transported when positioned on an upper surface 48 of the support member. In one example embodiment, the support member 44 is constructed of ethylene vinyl acetate (also known as EVA) and the housing 42 is constructed of a polymeric material such as plastic. Other suitable materials of the support member 44 include, but are not limited to, foam rubber or rubber.

The central member 54 is rectangularly shaped and comprises a reduced thickest "t" that is less than the thickness of arcuate edges 50, 52. The reduced thickness "t" provides a relief or an undercut 56 from the upper surface 48 and lower surface 58 of the support member 44. This relief 56 allows for the passage of the strap 24 between the support member 44 and housing member 42 to occur without interference. In another example embodiment, the central member 54 has the same thickness as the arcuate edges 50, 52.

In one example embodiment, adhesive is applied to the lower surface 58 of the arcuate edges 50, 52 of the support member 44 prior to positioning the support member into the pocket 46 of the housing member 42. The adhesive secures the support member 44 to the housing 42 along the arcuate edges 50, 52 without bonding the central member 54, allowing for the free movement of the first slider arrangement 26 relative to the strap 24 in an unloaded condition.

The housing member 42 for both the first and second slider arrangements 26 and 28, respectively comprises first and second notches 62 and 64 for the passage of the strap 24 and a low friction substantially circular planer surface 66 surrounded by an annular lip 68, forming the pocket 46 therein. The notches 62, 64 comprise support plates 70, 72, which restrain the strap 24 within the housing member 42. The notches 62, 64 and support plates 70, 72 extend radially inward from the annular lip 68, terminating at openings 74, 76.

Spaced transversely and radially inward from openings 74, 76 of the housing member 42 is a friction surface 78. The friction surface 78 is rectangularly shaped forming a portion of the pocket 46 of the housing member 42. The width of the friction surface 78 is slightly larger than the width of the strap 24. During operation of the mobility system 10, the weight of the object being moved and residing on top of the support member 44 of the slider arrangements 26, 28, forces the strap 24 into contact with the friction surface 78. The friction surface 78 minimizes movement of the slider arrangements 26 and 28 along the strap 24 during loading of the mobility arrangement 10, and particularly, the first slider arrangement 26 that is adjustable along the length of the strap.

The reduction in movement of the slider arrangements 26 and 28 is desirably achieved during operation by the engagement of the strap 24 with the friction surface 78. The reduction in movement during operation is further achieved by a plurality of ribs 80 extending upward from the friction surface 78, engaging the strap 24 when an object is resting on the top of the support member 44 of the slider arrangements 26 and 28. Alternatively, the movement in the slider arrangement and in particular, the first slider arrangement 26 is restored in an unloaded condition as the strap 24 moves between the support member 44 and the housing member 42 above the friction surface 78.

The plurality of ribs 80 are formed into the friction surface 78 of the housing member 42. The ribs 80 are pyramidal in shape (as shown in the magnified view of FIG. 13) having an apex 82 extending away from the housing member 42 and toward the strap 24 and central member 54. In one example embodiment, the ribs 80 are thirty-thousandths of one inch (0.030") in overall height.

In one example embodiment, the annular lip 68 and circular planer surface 66 are co-molded and have a uniform thickness "m". In another embodiment, the uniform thickness "m" is approximately one hundred thousandths of one inch (0.100") and the diameter of the annular lip 68 is approximately seven (7") inches. In the illustrated example embodiment, the annular lip 68 radially extends from the circular planer surface at an external radius three tenth (0.3") inches and internal or fillet radius of two tenth (0.2") inches, as shown in the cross-sectional view of FIG. 14.

Referring again to FIGS. 8 and 9, the strap 24 passes through openings 74 and 76 on each of the slider arrangements 26 and 28 below the support member 44 and support plates 70 and 72, but above the friction surface 78. The second slider arrangement 28, unlike the first slider arrangement 26, is not adjustable about the strap 24, and is fixed to the strap at the second end 16. The second slider arrangement 28 is fixedly attached to the strap 24 by the locking of the terminal end 84 of the strap to itself by stitching, adhesive bonding, or a combination thereof along the region "J" illustrated in FIG. 8. The locking of the terminal end 84 of the strap 24 to the second slider arrangement 28 is additionally achieved by the passing of the terminal end through the exit opening 76 of notch 64, forming a loop 86 over support plate 72 and reinserting the terminal end into the opening 76, but through an upper entry 88. At the upper entry 88, the terminal end 84 overlays the strap 24 originally extending through the openings 74 and 76 but lies below the support member 44 in region J. The loop 86 formed over the support plate 72 prevents movement of the second slider arrangement 28 along the strap 24.

In addition the securing achieved by sewing and/or adhesive bonding of the terminal end 84 and strap 24, the weight of the object to be transported when positioned on slider arrangement 28 assists in holding the second slider arrangement from moving relative to the strap. It should be appreciated by one skilled in the art that the first slider arrangement 26 does not include a loop 86, and when there is no object located on the first slider (unloaded condition), it is able to be freely adjusted to a desired length of the object about the length of the strap 24. The relief 56 in the support member 44 allows the strap 24 to pass over the ribs 80 without hindrance in an unloaded condition. In the alternative embodiment lacking the relief 56, the combination of the pocket 46 and flexible material of the support member 44 allow for the free movement in adjusting the strap 24. When the load of the object is applied to the support member 44 of the first slider arrangement 26, the load of the object, friction plate 78, and ribs 80 prevent the first slider arrangement from moving relative to the strap 24.

In an alternative example embodiment, the stitching and/or adhesive bonding occurs at the outside of the housing member 42 and between the slider arrangements 28 and 26 on the strap 24. In this example embodiment, sewing or adhering of the strap 24 and its overlapping section is more conducive for manufacturing. In yet another example embodiment, the sewing and/or adhesive bonding occur both under and outside of the housing member 42.

Figure 17:
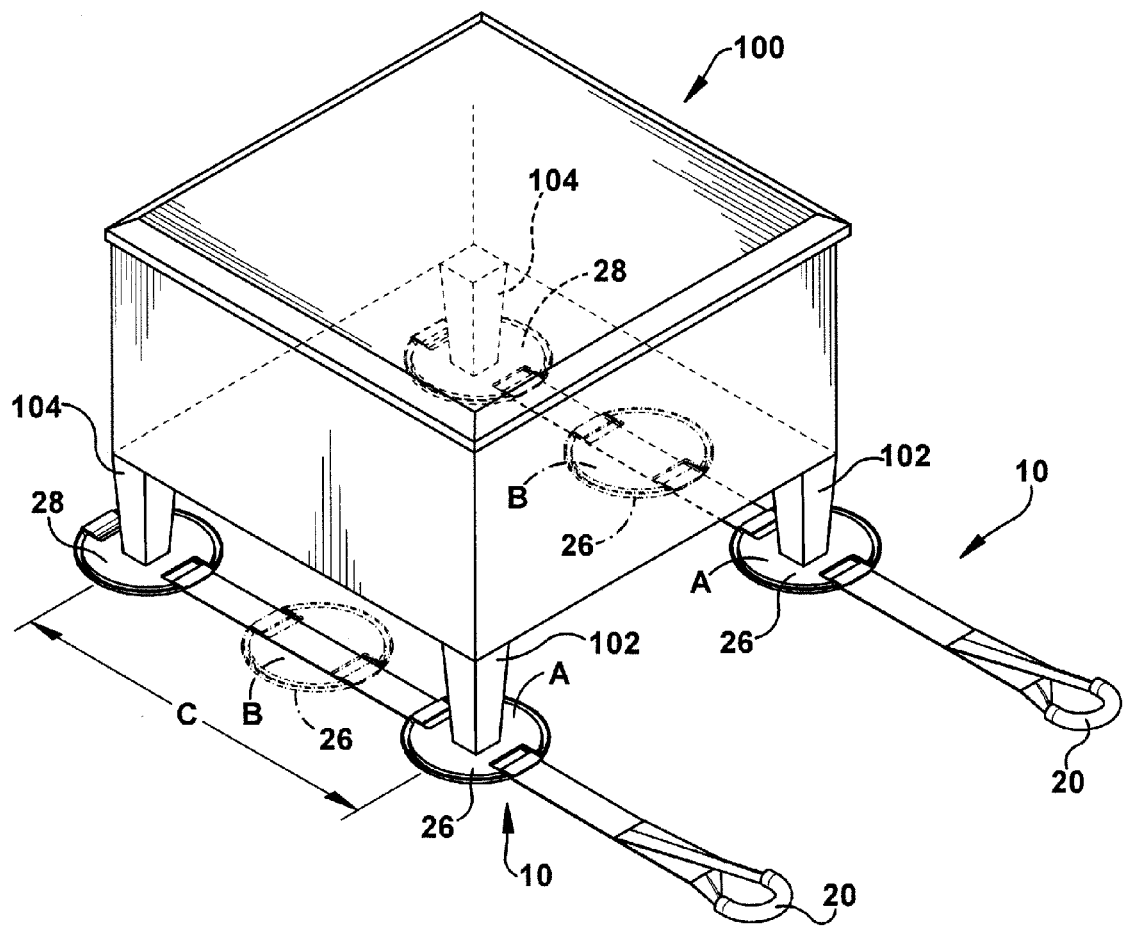
FIG. 17 illustrates an object being transported during the operation of the mobility system in accordance with one example embodiment of the present disclosure.

During operation, an object 100 desirable of being moved having a pair of front legs 102 and a pair of rear legs 104 is shown in FIG. 17. The distance between the front and rear legs, indicated by dimension "C" will vary among objects 100. As can be appreciated by one skilled in the art, two mobility systems 10 are used to transport the object 100. In order to install the mobility device 10 under the object 100, the first slider arrangement 26 is adjusted from a first position B to a second position A, such that the distance between the first slider arrangement and second slider arrangement 28 matches the distance of dimension C. The first slider arrangement 26 is adjusted by passing the strap 24 through the openings 74 and 76 of the first slider arrangement, advancing the first slider arrangement away from the second slider arrangement 28 until the desired spacing between arrangements is achieved. The strap 24 during the adjustment of the first slider arrangement 26 moves freely and uninhibited by the plurality of ribs 80, friction plate 78, or central member 54.

Once the desired spacing is achieved between slider arrangements, the object 100 is raised such that a slider arrangement 26 and 28 from each mobility system 10 is positioned under a leg 102, 104 of the object. The weight of the object 100 then compresses the support member 44 such that the strap 24 is forced against ribs 80 to preclude movement of the first slider arrangement 26. The object 100 can now be transported to the desired location by one or more persons pulling on handles 20 in the direction sought as would be appreciated by one skilled in the art. If necessary, a second person can advantageously push on the rear of the object 100 simultaneously as the first person is pulling on the handles 20. The low coefficient of friction surface of the housing member 42 allows the object 100 and mobility systems 10 to glide across the ground surface with reduced effort to the desired location.

Advantageously, the design of the first and second slider arrangements 26 and 28, respectively are identical such that complexity and cost for manufacturing is minimized. It should further be appreciated by one skilled in the art that objects to be moved do not require legs to utilize the advantages described in the mobility system 10. Stated another way, an object having a planer surface could also use the example embodiments of the mobility system 10 described above by positioning the first and second slider arrangements 26 and 28 between the planer surface of the object and the surface of the floor.

Figure 18:
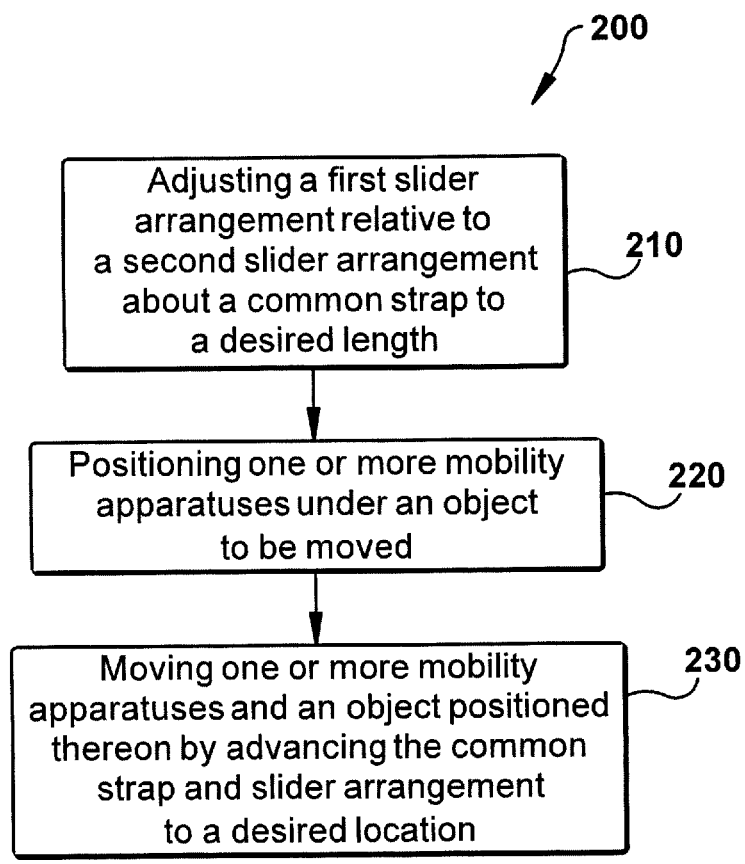
FIG. 18 is a flow chart illustrating a process and method for moving objects using a mobility apparatus in accordance with one example embodiment of the present disclosure.

FIG. 18 is a flow chart illustrating a process 200 and method for moving objects using a mobility apparatus in accordance with one embodiment of the present disclosure. At 210, the process 200 comprises utilizing one or more mobility apparatus by adjusting a first slider arrangement relative to a second slider arrangement about a common strap to a desired length, the common strap during adjustment in an unloaded condition freely passing through the first slider arrangement and being fixedly attached to the second slider arrangement. At 220, the process 200 comprises positioning one or more mobility apparatuses under the object to be moved. At 230, the process 200 comprises moving the one or more mobility apparatuses and object positioned thereon by advancing the common strap, second slider arrangement, and now fixedly attached first slider arrangement to a desired location.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A mobility apparatus for transposing objects along a surface comprising:
    first and second slider arrangements for supporting an object to be transported, the first and second slider arrangements having a low friction first surface and a high friction second surface, the first and second slider arrangements being coupled by a common strap, the strap having first and second ends; a loop located near said second end securing the second slider arrangement to a fixedly attached connection with said common strap;
    first and second openings located in said first slider arrangement such that said first slider arrangement in an unloaded condition freely moves along an adjustment length of said common strap, said first and second slider arrangements further comprise said high friction second surface having a plurality of ribs for engaging said common strap, during a loaded condition.

2. The mobility apparatus of claim 1 herein said common strap is continuous between said first slider arrangement and said second slider arrangement.

3. The mobility apparatus of claim 1 wherein said first and second slider arrangements further comprise a housing member and support member such that said common strap as it passes through said first and second openings located in said first slider arrangement for relatively free movement therein without interference between said friction surfaces and said support member in an unloaded condition along are adjustment length of said common strap.

4. The mobility apparatus of claim 1 wherein said common strap is coupled to a handle assembly located at said first end.

5. The mobility apparatus of claim 4 wherein said common strap is continuous from said first end to said second end.

6. The mobility apparatus of claim 5 wherein said first slider arrangement is adjustably located along said common strap from a point of engagement with said, second slider arrangement at said second end to said handle assembly at said first end.

7. The mobility apparatus of claim 4 wherein said handle assembly further comprises a handle having a continuous tubular passage between first and second openings, the continuous tubular passage configured for coupling to said common strap.

8. The mobility assembly of claim 7 wherein said handle assembly further comprises a tether having first and second ends such that one of said ends passes through said continuous tubular passage and is secured to the other of said ends and said come on strap.

9. The mobility assembly of claim 7 wherein said handle assembly further comprises a loop ring formed from said common strap at said first end, a first portion of the loop ring passing through said continuous tubular passage and is secured to a second portion of the loop ring.

10. The mobility system of claim 1 wherein said high friction second surface is formed within a respective support member in both said first and second slider arrangements, said ribs extending from the support member in a single direction toward said common strap.

11. A method for moving an object across a surface using a mobility apparatus comprising:
    adjusting a first slider arrangement relative to a second slider arrangement about a common strap to a desired length, the common strap during adjustment in an unloaded condition freely passing through the first slider arrangement and being fixedly attached to the second slider arrangement wherein the common strap is a continuous strap; and
    immobilizing said first slider arrangement for relative movement about said common strap by subjecting said first slider arrangement to a loaded condition by positioning an object to be moved upon said first slider arrangement; positioning the object to be moved upon said second slider arrangement; and advancing the object to be moved, first and second slider arrangements, and mobility apparatus by pulling the common strap.

12. The method of claim 11 further comprising providing a handle assembly along said common strap for pulling the mobility apparatus during use.

13. The method of claim 11 further comprising providing a friction surface within said first slider arrangement to facilitate the immobilizing of the first slider arrangement in a loaded condition.

14. A mobility system for transporting objects along a surface comprising:
    first and second slider arrangements for positioning beneath an object to be transported, a strap having first and second ends, the strap being coupled to said first and second slider arrangements by passing said strap through first and second openings located in said first and second slider arrangements; and
    a high friction surface located in said first slider arrangement such that said first slider arrangement in an unloaded condition freely moves along an adjustment length between said first and second ends of said strap.

15. The mobility system of claim 14 further comprising a secured connection formed between said second slider arrangement and said strap.

16. The mobility system of claim 15 wherein said secured connection is located at said second end of said strap.

17. The mobility system of claim 14 further comprising a handle assembly located at said first end of said strap.

18. The mobility system of claim 14 wherein said high friction surface further comprises a plurality of ribs for engaging said strap during a loaded condition.

19. The mobility system of claim 18 wherein said first slider arrangement further comprises a housing member and a support member, the plurality of ribs formed and extending from said housing member toward said support member and engaging said strap passing therebetween during a loaded condition to form a relatively immobile state of relative movement between said strap and said first slider arrangement and during an unloaded condition the strap passing over said plurality of ribs between said housing member and said support member to form a relatively mobile state of relative movement between said strap and said first slider arrangement allowing for adjustment in the location of the first slider arrangement along the adjustment length of said strap.

20. A mobility apparatus for transporting objects along a surface comprising:
- first and second slider arrangements for supporting an object to be transported, the first and second slider arrangements having a low friction first surface and a high friction second surface, the first and second slider arrangements being coupled by a common strap, the strap having first and second ends; a loop located near said second end securing the second slider arrangement to a fixedly attached connection with said common strap;
- the first slider arrangement further comprising a housing having a pocket for nesting a support member therein; and
- first and second openings located in said housing of said first slider arrangement such that said first slider arrangement in a unloaded condition freely moves along an adjustment length of said common strap through said first and second openings and substantially centrally between and about said support member and said housing.

* * * * *